(12) United States Patent
Matsuura

(10) Patent No.: US 6,347,030 B1
(45) Date of Patent: Feb. 12, 2002

(54) BATTERY SUPPLY CONTROL UNIT

(75) Inventor: Kimihiro Matsuura, Shizuoka-ken (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/361,531

(22) Filed: Jul. 27, 1999

(30) Foreign Application Priority Data

Jul. 28, 1998 (JP) ............................. 10-213088

(51) Int. Cl.⁷ .................. H01H 47/00; H01H 47/14
(52) U.S. Cl. ..................... 361/166; 361/18; 361/86; 361/160; 361/166; 361/167; 361/168.1; 361/170; 307/10.6
(58) Field of Search .............. 307/10.6, 10.7, 307/10.8, 39, 41, 141, 10.1, 9.1; 361/86, 18, 83, 92, 195–198, 192–202, 160, 166, 167, 168.1, 170, 189, 191; 315/82; 320/127, 131, 133, 135, 136

(56) References Cited

U.S. PATENT DOCUMENTS

| | | | | |
|---|---|---|---|---|
| 4,305,004 A | * | 12/1981 | Tanaka et al. | 307/10 R |
| 4,600,966 A | * | 7/1986 | Mueller et al. | 361/166 |
| 4,707,788 A | * | 11/1987 | Tashiro et al. | 364/424 |
| 5,142,162 A | * | 8/1992 | Sunden et al. | 307/10.7 |
| 5,321,309 A | * | 6/1994 | Kolomyski | 307/10.8 |
| 5,473,201 A | * | 12/1995 | Gantenbein et al. | 307/10.6 |
| 5,633,540 A | * | 5/1997 | Moan | 307/126 |
| 5,856,711 A | * | 1/1999 | Kato et al. | 307/10.6 |
| 5,889,645 A | * | 3/1999 | Kadah et al. | 361/191 |
| 5,920,186 A | * | 7/1999 | Ninh et al. | 323/908 |

* cited by examiner

*Primary Examiner*—Josie Ballato
*Assistant Examiner*—Vaughn J. Marquis
(74) *Attorney, Agent, or Firm*—Finnegan, Henderson, Farabow, Garrett & Dunner, L.L.P.

(57) ABSTRACT

A disclosed battery supply control unit comprises a large current relay in which an excitation current continuously flows when it is in its connecting state and a small current relay in which a limited excitation current flows only at the time of changeover between its connecting state and non-connecting state. If loads require a large current, the large current relay and small current relay are maintained in the connecting state, and if the loads do not require the large current, the large current relay is maintained in the non-connecting state while the small current relay is maintained in the connecting state at least in a predetermined time.

5 Claims, 4 Drawing Sheets

BATTERY SUPPLY CONTROL UNIT

FIELD OF THE INVENTION

The present invention relates to a battery supply control unit that controls a current supply from a battery to a load, and more particularly to a battery supply control unit capable of preventing electric discharge by a dark current from the battery.

BACKGROUND OF THE INVENTION

According to considerations of the inventor of the present invention, a vehicle such as an automobile includes a plurality of loads such as an engine electronic control unit, meter electronic control unit, automatic transmission electronic control unit, memory provided unit and the like. To drive such plural loads during driving of the vehicle, an electric power needs to be supplied and therefore, the vehicle is provided with a battery.

The battery supply control unit provided to the vehicle controls a supply of electric current from the battery to the plural loads.

FIG. 3 shows a structure of a circuit which is an example of a conventional battery supply control unit which has been analyzed by the present inventor.

Referring to FIG. 3, the battery supply control unit 114a controls a supply of electric power of a battery 111 applied via a fuse 113 to a plurality of loads 121a to 121n. The battery supply control unit 114a comprises a vehicle mounted relay 115, a transistor 117 and a controller 119. The vehicle mounted relay 115 has an electromagnetic coil 116a and a contact piece 116b. When the contact piece 116b is closed (ON), loads 121a to 121n are supplied with electric power from battery 111.

With the above structure, when a vehicle is driving, ignition (IG) is turned ON or its engine is turned ON, so that ignition signal IGS (H level) is input to a controller 119 through a terminal B.

Next, the controller 119 turns ON the transistor 117 so that a current flows from the battery 111 to the transistor 117 through the electromagnetic coil 116a. Thus, causing the contact piece 116b to close, i.e., is turned ON. As a result, electric power from the battery 111 is supplied to the plurality of loads 121a to 121n so that a predetermined current of about several amperes (A) flows through these loads.

On the other hand, during non-driving conditions, ignition is turned OFF or the engine is turned OFF, so that the ignition signal IGS (L level) is input to the controller 119. Then, the controller 119 outputs L level ignition signal IGS for a predetermined period of time interval. The predetermined period of time interval may, for example, be several days to about one month.

Because the transistor 117 is kept ON for a predetermined period of time interval, a dark current I of several tens mA flows from the battery 111 to the transistor 117 through the electromagnetic coil 116a. At the same time, because the contact piece 116b is ON for the predetermined period of time interval, electric power of the battery 111 is supplied to the plurality of the loads 121a to 121n.

After the predetermined period of time interval elapses, the controller 119 turns OFF the transistor 117 so that no dark current flows from the battery 111 to the electromagnetic coil 116a. Thus, the contact piece 116b is opened (OFF) thereby interrupting the supply of the electric power from the battery 111 to the plurality of the loads 121a to 121n.

However, such a structure can not prevent a large discharge of the battery. Further, because the dark current may continue to flow, the discharge period of the battery 111 is also quickened.

FIG. 4 shows a circuit structure diagram of another example of a conventional battery supply control unit.

In FIG. 4, a battery supply control unit 114b comprises a keep relay 123, a controller 125, a reset transistor 126 and a set transistor 127. The keep relay 123 has a 2-winding coil 124a and a contact piece 124b. The keep relay 123 allows an electric power to be supplied to the 2-winding coil 124a only when the contact piece 124b is turned from ON to OFF or from OFF to ON, and after this changeover, the OFF state or ON state is maintained. The reset transistor 126 is connected to an end of one winding coil of the 2-winding coil 124a and the set transistor 127 is connected to an end of the other winding coil.

With such a structure, if H level ignition signal is input to the controller 125 through the terminal B, the controller 125 turns ON the set transistor 127 so that a current flows from one end of one winding coil to the other end thereby the contact piece 124b being turned ON.

On the other hand, during non-driving, if the L level ignition signal is input to the controller 125, the controller 125 turns ON the reset transistor 126 so that a current flows from the other end of the other winding coil to one end thereby the contact piece 124b being turned OFF.

Therefore, with such a structure, because a current flows to the 2-winding coil 124a only when contact piece 124b is turned from ON to OFF or from OFF to ON through the keep relay 123, power consumption is reduced.

However, because keep relay 123 generally has a low holding force for closing the contact point, the contact piece 124b may accidentally be turned OFF because of vibration or the like during vehicle driving. Thus, there is a need for improvement in the connection reliability of conventional battery supply control units during vehicle driving. Further, in general, keep relays are often not suitable for large currents. Therefore, to make it match such a large current, a more expensive keep relay is often required.

SUMMARY OF THE INVENTION

Figure 1:
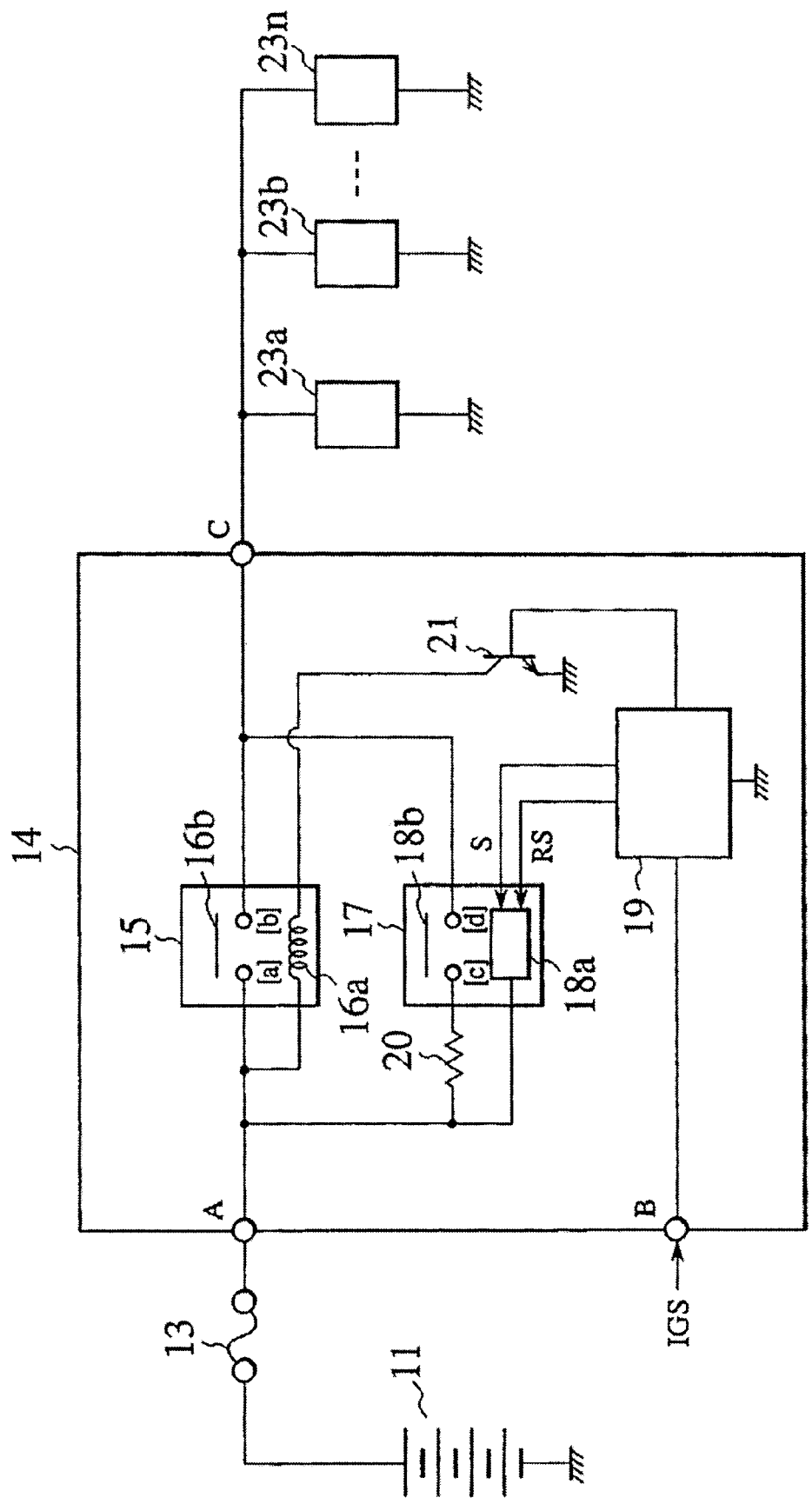
FIG. 1 is a circuit structure diagram of a battery supply control unit according to a first embodiment of the present invention.

It is an object of the present invention to provide a battery supply control unit for minimizing power consumption by loads and suppressing unnecessary discharge of a battery. It is another object of the present invention to produce a battery supply control unit at a low cost that is capable of ensuring a high reliability for supplying of electric power.

The battery supply control unit of the present invention comprises a large current relay which allows an excitation current to a continuously flow when it is in a connecting state and a small current relay which allows the excitation current to a limited flow at the time of changeover between a connecting state and a non-connecting state. When loads require a supply of a large current, both of the large current relay and small current relay are maintained in the connecting state and when the loads do not require a large current, the large current relay is maintained in the non-connecting state while the small current relay is maintained in the connecting state for a predetermined finite time.

More specifically, the present invention provides a battery supply control unit comprising: a signal input portion in which a signal corresponding to a state in which a load connected to a battery require a relatively large current and a signal corresponding to a state in which the load connected to the battery do not require a relatively large current are input; a large current relay provided between the battery and the load and having a first electromagnetic coil and a first contact piece, in which an excitation current flows to the first electromagnetic coil and the first contact piece is maintained in closed state so as to supply the relatively large current to the load; and a small current relay connected in parallel to the large current relay and having a second electromagnetic coil and a second contact piece, in which only at the time of changeover between a closed state of the second contact piece and an open state thereof, an excitation current flows to the second electromagnetic coil, the second contact piece is maintained in the closed state or the open state correspondingly, and the second contact piece is maintained in the closed state such that a relatively small current, which corresponds to one when the load do not require the relatively large current, flows to the load.

Here, corresponding to the signal input to the signal input portion, when the load require the relatively large current, the first contact piece of the large current relay is maintained in the closed state while the second contact piece of the small current relay is maintained in the closed state, and when the load do not require the relatively large current, the first contact piece of the large current relay is maintained in an open state while the second contact piece of the small current relay is maintained in the closed state.

With such a structure, if the loads connected to the battery require the large current, the electric power of the battery is supplied to the loads mainly through the large current relay. Because the large current relay is highly resistant to vibration, it can maintain a high reliability even under environments having large vibrations and shock.

If the loads connected to the battery do not require the large current, the large current relay is not maintained in the closed state, thereby preventing a premature discharge of the battery.

Further, if the loads connected to the battery do not require the large current, the electric power of the battery is supplied to the loads through the small current relay in which the excitation current flows. As a result, the power consumption of the battery can be minimized with this simple structure and a low production cost.

It is preferable that the battery supply control unit described above further comprises a control portion that controls the large current relay and the small current relay such that if the loads require a large current, the first contact piece of the large current relay is maintained in the closed state while the second contact piece for the small current relay is maintained in the closed state, and if the loads do not require a large current, the first contact piece of the large current relay is maintained in the open state while the second contact piece of the small current relay is maintained in the closed state, corresponding to the signal input to the signal input portion.

In such a structure, the control portion and large current relay are connected via the transistor and the control portion controls the continuity of the transistor so as to control the large current relay. This structure is preferable because a secure operation can be attained with a simple structure.

Further, the battery supply control unit described above may further comprise a control portion that controls the small current relay such that if the loads require the large current, the second contact piece of the small current relay is maintained in the closed state and if the loads do not require the large current, the second contact piece of the small current relay is maintained in the closed state, corresponding to the signal input to the signal input portion.

In such a structure, preferably, by using the signal input to the signal input portion, if the loads require a large current, the first contact piece of the large current relay is maintained in closed state and if the loads do not require a large current, the first contact piece of the large current relay is maintained in open state.

Further, the battery supply control unit described above may be so constructed that if the loads do not require the large current, the first contact piece of the large current relay is maintained in the open state and the second contact piece of the small current relay is maintained in the closed state in a predetermined period of time.

With such a structure, if a situation is reached in which the loads do not require the large current and then the supply of the current to the loads may be completely stopped, the supply of the current to the loads can be stopped thereby preventing an unnecessary discharge of the battery effectively.

Further, preferably, in the battery supply control unit of the present invention, the small current relay is connected to the battery through a resistor. This structure is preferable because reliable operation can be attained.

DETAILED DESCRIPTION

Hereinafter, the respective embodiments of the present invention will be described in detail with reference to the accompanying drawings.

First, a battery supply control unit according to a first embodiment of the present invention will be described with reference to FIG. 1.

FIG. 1 shows a circuit structure diagram of the battery supply control unit according to this embodiment.

As shown in FIG. 1, the battery supply control unit 14 of this embodiment controls a supply of electric power from the battery 11 input through a terminal A via a fuse 13 to a plurality of loads 23a to 23n via a terminal C. The battery supply control unit 14 includes a vehicle mounted relay 15, a keep relay 17 connected in parallel to the vehicle mounted relay 15, a controller 19 and a transistor 21. The loads 23a to 23n, for example, may include engine electronic control unit, meter electronic control unit, automatic transmission electronic control unit, chassis electronic control unit, vehicle condition monitoring unit and the like.

The vehicle mounted relay 15 has an electromagnetic coil 16a in which one end thereof is connected to the fuse 13 and the other end thereof is connected to the transistor 21, and a contact piece 16b. When the contact piece 16b is turned ON, the vehicle mounted relay 15 always makes electric current supplied to the electromagnetic coil 16a.

The keep relay 17 has a 2-winding coil 18a and a contact piece 18b. Only when the contact piece 18b is turned from ON to OFF or from OFF to ON, is the 2-winding coil 18a supplied with electric current. Keep relay 17 keeps an ON state or OFF state after the contact piece 18b is turned. A resistor 20 is connected directly to the contact piece 18b of the keep relay 17. A set signal S for turning ON the contact piece 18b is input from the controller 19 to one winding coil of the 2-winding coil 18a of the keep relay 17 and, a reset signal RS for turning OFF the contact piece contact piece 18b is input from the controller 19 to the other winding coil of the 2-winding coil 18a.

If H-level ignition signal IGS is input during driving of the vehicle, the controller 19 turns ON the transistor 21 and if L-level ignition signal IGS is input during non-driving conditions of the vehicle, it turns OFF the transistor 21 immediately. Further, the controller 19 inputs the L-level ignition signal IGS for a predetermined period of time. When the predetermined period of time passes, the controller 19 outputs the reset signal RS for turning OFF the contact piece contact piece 18b of the keep relay 17 to the other winding coil of the 2-winding coil 18a.

Next, an operation of the battery supply control unit according to this embodiment having such a structure will be described in detail.

First, the loads 23a to 23n start their operations. So a relatively large current of about several amperes (A) or a current required for normal operation is needed. During driving, the operating environment includes vibration, shock and the like. The vehicle mounted relay 15 and the keep relay 17 are turned ON during driving.

Specifically, if ignition is turned ON to start the vehicle, ignition signal (H level) IGS is input to the controller 19 through the terminal B. The ignition signal (H level) IGS is a signal corresponding to a state in which the loads 23a to 23n start their operations so that the relatively large current of about several ampere (A) is needed. Further, this is a signal corresponding to a state in which the vehicle is about to go into a driving environment which includes vibration, shock and the like.

Then, the controller 19 turns ON the transistor 21, so that a current flows from the battery 11 to the transistor 21 through the electromagnetic coil 16a. The contact piece 16b is turned ON, so that an electric power of the battery 11 is supplied to the plurality of the loads 23a to 23n through the vehicle mounted relay 15, thereby a desired current flowing to the loads 23a to 23n.

If the ignition signal IGS is input to the controller 19, it outputs the set signal S to the winding coil of the 2-winding coil 18a, so that the contact piece contact piece 18b is turned ON.

Here, the resistor 20 is connected directly to the keep relay 17. The keep relay 17 and vehicle mounted relay 15 are connected in parallel.

Thus, a current from the battery 11 flows mainly through the vehicle mounted relay 15 and a remainder current flows through the keep relay 17, so that both the currents are supplied to the plurality of the loads 23a to 23n.

The vehicle mounted relay 15 requires the relatively large current of about several amperes (A). Further, even upon driving where vibration, shock and the like may occur, a desired current can be supplied to the loads 23a to 23n with a high reliability.

Below is a description for the operation for turning OFF the ignition when driving stops.

If ignition is OFF, that is, the engine is OFF only the keep relay 17 is turned ON so as to minimize power consumption, since the loads 23a to 23n are not required to execute normal operation it is not necessary to consider vibration, shock or the like, Specifically, if ignition is turned OFF, the ignition signal (L level) IGS is input to the controller 19. Then, the controller 19 turns OFF the transistor 21 so that the flow of a current from the battery 11 to the electromagnetic coil 16a is stopped. Thus, a supply of current from the keep relay 17 to the loads 23a to 23n is maintained and the contact piece 16b is turned OFF, so that the supply of a current from the vehicle mounted relay 15 to the loads 23a to 23n is interrupted. The ignition signal (L level) IGS is a signal corresponding to a state in which the loads 23a to 23n stops their operations so that the relatively large current of about several amperes (A) is not necessary. This signal corresponds to a state in which the vehicle does not experience vibration, shock and the like since it is a non-driving condition.

If the L-level ignition signal IGS is input to the controller 19, the controller 19 provides the L-level ignition signal for a predetermined period of time. Such a predetermined period of time can be set up depending on needs, for example, the predetermined period of time can be several days to about one month.

During the predetermined period of time, because the contact piece 18b is kept ON, a small current from the battery 11 is supplied to the plurality of the loads 23a to 23n through the resistor 20 and contact piece 18b. Therefore, the power consumption is minimized.

Further, when the predetermined period of time elapses, the controller 19 outputs the reset signal RS to the other winding coil of the 2-winding coil 18a so that the contact piece 18b is turned OFF. Therefore, the supply of a current from the battery 11 to the plurality of the loads 23a to 23n is completely interrupted. Therefore, after the interruption of the power supply, power consumption is zero.

In the structure of this embodiment, as described above, by connecting the vehicle mounted relay 15 and keep relay 17 in parallel to each other, the characteristics of the vehicle mounted relay 15 and keep relay 17 provide a reliable battery supply control unit.

Specifically, when the ignition is turned ON, mainly the vehicle mounted relay 15 is used so as to supply a current to the loads 23a to 23n. That is, because the resistor 20 is connected to the contact piece 18b of the keep relay 17, when the ignition is ON, a current from the battery 11 is supplied to the loads 23a to 23n mainly through the vehicle mounted relay 15. As a result, such a structure requiring the relatively large current and capable of maintaining a high reliability in power feed even during the driving of the vehicle with a large vibration and shock is achieved.

When the ignition is OFF, the current from the battery 11 is supplied to the loads 23a to 23n through the keep relay 17. That is, when the ignition is OFF, power supply to the electromagnetic coil 16a of the vehicle mounted relay 15 is stopped so as to turn OFF the contact piece 16b, thereby turning OFF the vehicle mounted relay 15 to prevent an electric discharge of the battery 11 effectively. Because the contact piece 18b is kept ON for the predetermined period of time from when the ignition is OFF, a current from the battery 11 is supplied in the form of a small current to the loads 23a to 23n through the resistor 20 and keep relay 17. Further, an excitation current flows only at the time of the changeover after the predetermined period of time. As a result, the power consumption is effectively minimized.

Therefore, in the battery supply control unit according to this embodiment, the vehicle mounted relay 15 can be effectively used so that the power consumption can be minimized and a high reliability can be attained. Further, a low cost and simple structure can be achieved.

Next, a battery supply control unit according to a second embodiment of the present invention will be described in detail with reference to FIG. 2.

Figure 2:
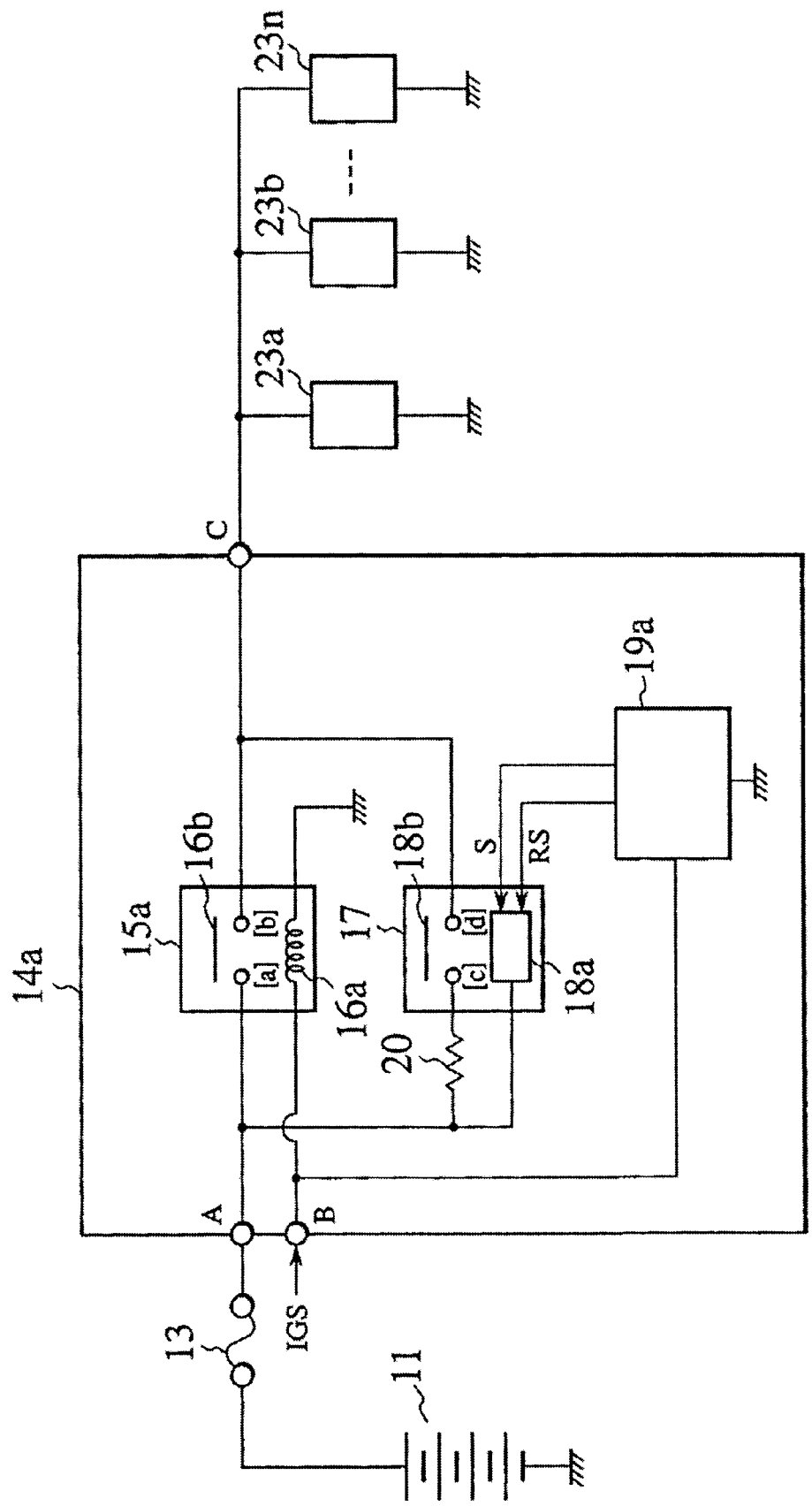
FIG. 2 is a circuit structure diagram of a battery supply control unit according to a second embodiment of the present invention.
Figure 3:
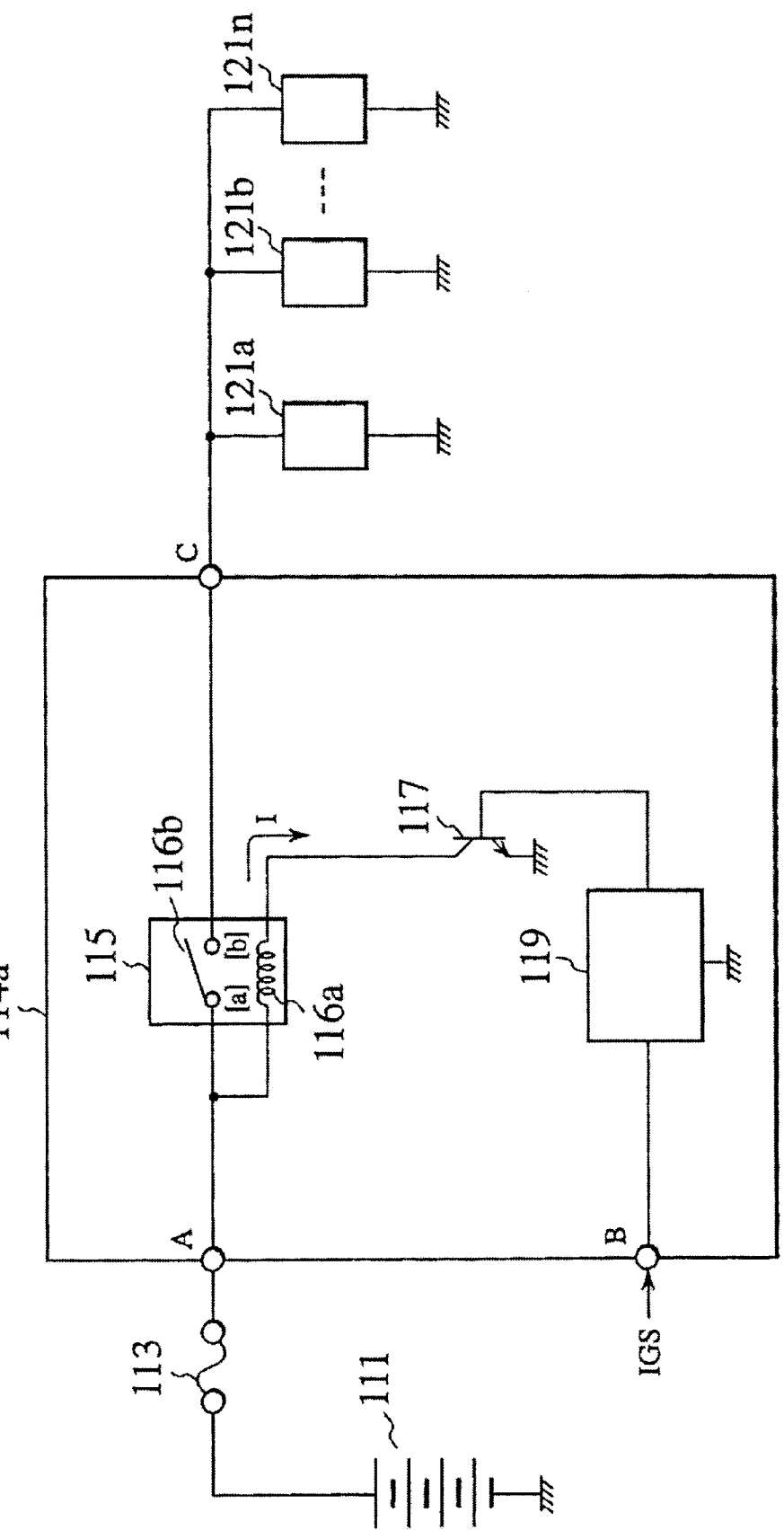
FIG. 3 is a circuit structure diagram of a battery supply control unit.
Figure 4:
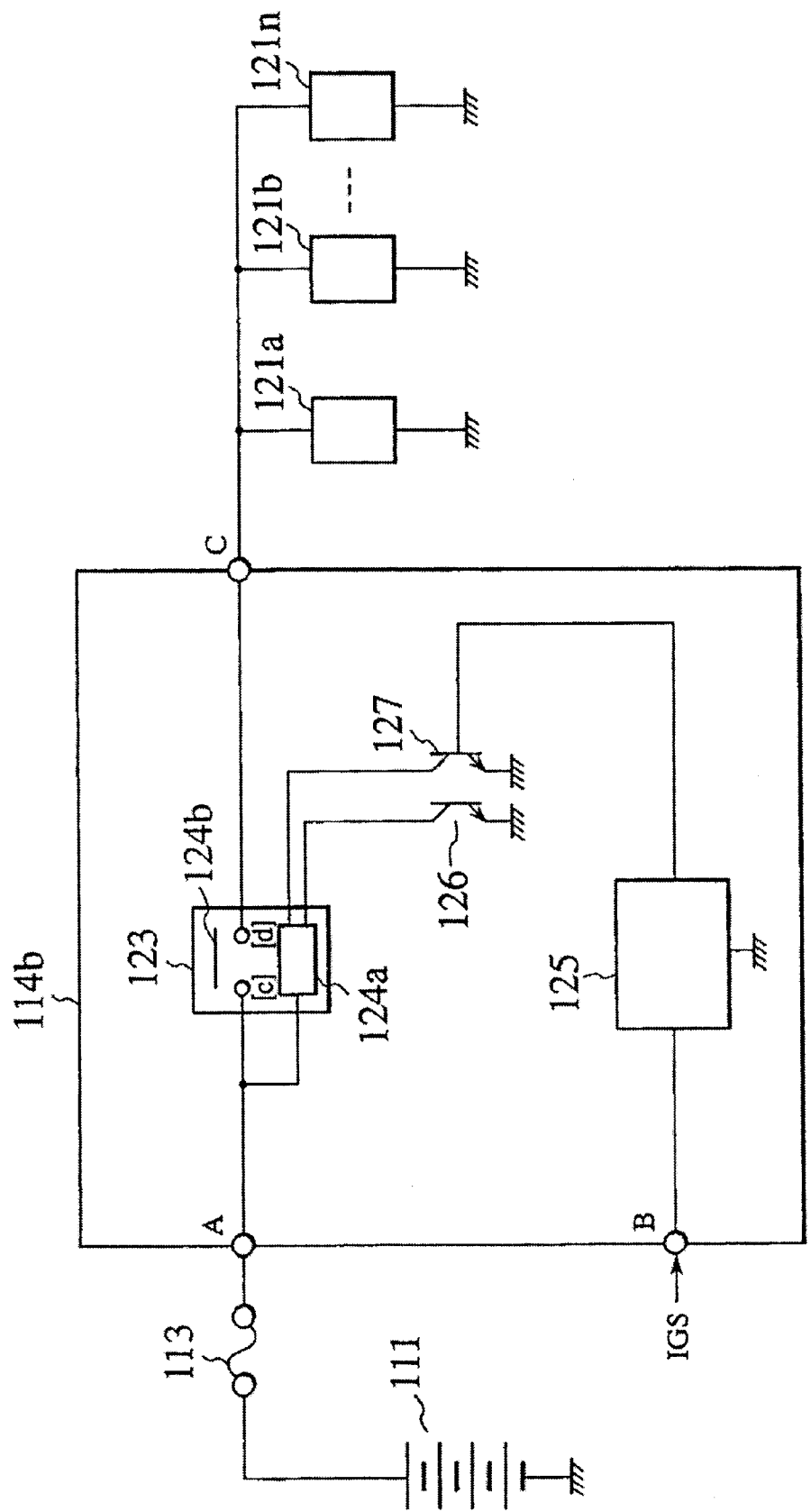
FIG. 4 shows another circuit structure diagram of a battery supply control unit.

FIG. 2 shows a circuit structure diagram of the battery supply control unit according to this embodiment.

As shown in FIG. 2, the battery supply control unit 14a of this embodiment comprises a vehicle mounted relay 15a, a keep relay 17 connected to the vehicle mounted relay 15a in parallel, and a controller 19a. The vehicle mounted relay 15a comprises an electromagnetic coil 16a in which one end thereof is connected to a terminal B in which the ignition signal IGS is to be input and the other end thereof is grounded, and a contact piece 16b. The controller 19a is connected to the terminal B and provides the L-level ignition signal IGS is input for a predetermined period of time. After the predetermined period of time elapses, a reset signal RS for turning OFF the contact piece 18b of the keep relay 17 to the other winding coil of the 2-winding coil 18a is sent.

That is, in the structure of this embodiment, the transistor 21 of the battery supply control unit 14 of the first embodiment is removed and the ignition signal IGS is input directly to the vehicle mounted relay 15a. Because the other structure is the same as that of the first embodiment, the same reference numerals are attached to the same components and a description thereof is omitted.

In the battery supply control unit 14a of this embodiment, because the ignition signal IGS (H level) is supplied to the electromagnetic coil 16a when the vehicle is diving, the contact piece 16b of the vehicle mounted relay 15a is turned ON and the electric power of the battery 11 is supplied to the plurality of the loads 23a to 23n mainly through the vehicle mounted relay 15a, so that a desired large current can be supplied.

If the ignition signal IGS is input to the controller 19a, it outputs a set signal S to the winding coil of the 2-winding coil 18a of the keep relay 17, so that the contact piece 18b of the keep relay 17 is turned ON and kept ON.

That is, if both the vehicle mounted relay 15a and keep relay 17 are ON, a current from the battery 11 flows mainly through the vehicle mounted relay 15a, while a part of the current flows through the keep relay 17 and it is supplied to the plurality of the loads 23a to 23n.

Next, because when the ignition is OFF, the ignition signal IGS becomes L level, no current flows through the electromagnetic coil 16a of the vehicle mounted relay 15a. Therefore, the contact piece 16b of the vehicle mounted relay 15 is turned OFF, the supply of current from the vehicle mounted relay 15a is interrupted although the supply of current from the keep relay 17 is maintained.

The controller 19a executes the time control for a predetermined period of time with the timer since the L-level ignition signal IGS is input and in this predetermined period of time, the contact piece 18b of the keep relay 17 is kept ON, a current from the battery 11 is supplied to the plurality of the loads 23a to 23n through the resistor 20 and contact piece 18b of the keep relay 17, so that a small current supply condition is achieved. Then, after the predetermined period of time elapses, the controller 19a outputs the reset signal RS to the other winding coil of the 2-winding coil 18a of the keep relay 17 so as to turn OFF the contact piece 18b, so that the supply of the power from the battery 11 to the plurality of the loads 23a to 23n is interrupted.

As described above, in the battery supply control unit of this embodiment, the same effect as the battery supply control unit of the first embodiment is maintained and the additional transistor 21 is removed and further a necessity for the controller 19a to control the transistor 21 is eliminated. Thus, a simpler and cheaper battery supply control unit can be provided.

Although in the above respective embodiments, the 2-winding type keep relay is used, it is of course permissible to use a 1-winding type keep relay instead of the 2-winding type keep relay.

Further, in the above respective embodiments, it is permissible to continuously supply the set signal S to one winding coil of the 2-winding coil 18a of the keep relay 17 when the ignition signal is ON, thereby improving the connection reliability of the contact piece 18b of the keep relay 17.

Still further, the present invention is not limited to the above respective embodiments, but it is needless to say that various modifications can be attained within a scope not departing from the technical concept of the present invention.

What is claimed is:

1. A battery supply control for controlling current supplied from a battery to at least one load, comprising:
    an input for receiving a demand signal indicating when a current is demanded by the at least one load;
    a first relay, disposed between the battery and the at least one load, capable of substantially passing the current demanded by the at least one load when the first relay is closed;
    a second relay, connected in parallel to the first relay, capable of passing a fraction of the current demanded by the at least one load when the second relay is closed; and
    a controller for closing the first and second relays when the demand signal indicates the at least one load demands the current, such that the current is supplied to the at least one load, and for opening the first relay and maintaining the second relay closed when the demand signal indicates the at least one load does not demand current, such that the fraction of the current is supplied to the at least one load.

2. The battery supply control of claim 1, further comprising:
    a transistor, connected between the controller and the first relay, providing an excitation signal for closing the first relay.

3. The battery supply control of claim 1, wherein the controller maintains the second relay closed for a predetermined time when demand signal indicates the at least one load does not demand the current.

4. The battery supply control of claim 1, further comprising:
    a resistor connected between the second relay and the battery.

5. A system for supplying a plurality of currents from a battery to at least one load, comprising:
    a battery;
    at least one load; and
    a battery supply control, connected between the battery and the at least one load, comprising:
        an input for receiving a demand signal indicating when a current is demanded by the at least one load;
        a first relay, disposed between the battery and the at least one load, capable of substantially passing the current demanded by the at least one load when the first relay is closed;

a second relay, connected in parallel to the first relay, capable of passing a fraction of the current demanded by the at least one load when the second relay is closed; and a controller for closing the first and second relays upon receiving a signal indicating the at least one load demands the current such that the current is supplied to the at least one load and for opening the first relay and maintaining the second relay closed upon receiving a signal indicating the at least one load does not demand the current such that the fraction of the current is supplied to the at least one load.

* * * * *